United States Patent [19]

Sauer

[11] Patent Number: 4,557,983

[45] Date of Patent: Dec. 10, 1985

[54] AIR/OXYGEN CELL

[75] Inventor: Hans Sauer, Idstein, Fed. Rep. of Germany

[73] Assignee: Varta Batterie Aktiengesellschaft, Hanover, Fed. Rep. of Germany

[21] Appl. No.: 602,593

[22] Filed: Apr. 20, 1984

[30] Foreign Application Priority Data

Apr. 22, 1983 [DE] Fed. Rep. of Germany ....... 3314624

[51] Int. Cl.$^4$ ...................... H01M 2/02; H01M 12/06
[52] U.S. Cl. ....................................... 429/27; 429/35; 429/162; 429/185
[58] Field of Search ................. 429/27, 157, 162, 164, 429/172, 174, 185, 34, 35

[56] References Cited

U.S. PATENT DOCUMENTS

| 3,897,265 | 7/1975 | Jaggard | 429/172 X |
| 4,054,726 | 10/1977 | Sauer et al. | 429/27 X |
| 4,189,526 | 2/1980 | Cretzmeyer et al. | 429/27 X |
| 4,343,869 | 8/1982 | Ottman et al. | 429/162 X |

Primary Examiner—Anthony Skapars
Attorney, Agent, or Firm—Weiser & Stapler

[57] ABSTRACT

In an air/oxygen button cell the multilayer air electrode is reliably held in place between an inwardly extending rib which is formed in the bottom of the cathode cup and a sealing base which is associated with the cup forming the negative electrode. The sealing base acts like a domed spring under tension because of a sloping portion provided in its bottom in the region above the rib. The air electrode remains flat and is secure against lateral displacements.

14 Claims, 2 Drawing Figures

AIR/OXYGEN CELL

BACKGROUND OF THE INVENTION

The present invention relates generally to air/oxygen cells, particularly button shaped cells comprised of an inner metal cup which receives the electrolyte and the negative electrode material and an outer metal cup which contains a multilayer positive air/oxygen electrode, joined with the interposition of an insulating seal.

The air electrode of such cells is multipurpose in function, its primary task being the depolarization of air/oxygen, and additional tasks including the limitation of material exchange ($CO_2$ absorption, water exchange), especially with the surrounding atmosphere; the prevention of electrolyte escape from the portion of the housing which is accessible to the air; the sealing against the housing cup with simultaneous good electrical contact; and the absorption of closure forces developed during the crimping process.

Regarding construction, such air electrodes are generally composed of an active carbon layer provided with a mesh conductor which serves as the actual depolarizing layer, and a hydrophobic cover layer (usually an unsintered PTFE foil) located on the air side of the electrode. If appropriate, the active carbon can be provided with a catalyst. On the air side, there is further generally provided a porous diffusion layer to improve air distribution.

In the assembly of such button cells, the introduction of the air electrode can create difficulties because it consists of a very thin multilayer structure which must be retained precisely within the cell in order to perform its complicated function in trouble-free manner. However, in crimping housing halves which have previously been provided with such cell components, it can happen that the air cathode does not remain in level position but becomes bowed as a result of displacement or plastic deformation during the crimping process. This can result in excessive material exchange with the atmosphere, escape of electrolyte through cracks in the hydrophobic cover layer, loss of contact between the mesh conductor and the cathode cup, separation of the depolarizing mass from the mesh conductor, or separation of the cover layer resulting from increased electrolyte pressure occurring during discharge.

In an effort to overcome such difficulties, a button cell described in German Pat. No. 2,454,890 achieves secure, electrolyte-fast retention of the air cathode by having the bottom of the cell cup and of the cathode bowed convexly toward the outside, and by holding the rim of the cathode firmly between the sealing base and a conforming step-shaped rim region of the cell cup.

SUMMARY OF THE INVENTION

The present invention has as its principle objects to provide a button cell structure which still further prevents deformation of the cathode during assembly, which achieves trouble-free sealing, and which assures proper electrical contact between the cathode and the cell cup.

These and other objects which will appear are achieved in accordance with the present invention by providing an air/oxygen button cell which is generally comprised of an inner metal cup for receiving the electrolyte and the negative electrode material and an outer metal cup for receiving a multilayer positive air electrode, joined with the interposition of an insulating seal, and which further includes a concentric, inwardly extending rib formed in the bottom of the outer metal cup to asist in firmly clamping the air/oxygen electrode between the rib and the seal.

In what follow, the invention will be further described with reference to the accompanying drawings wherein:

BRIEF DESCRIPTION OF THE DRAWINGS

In the views provided, like reference numerals denote similar structure.

DETAILED DESCRIPTION OF THE PREFERRED EMBODIMENT

Figure 1:
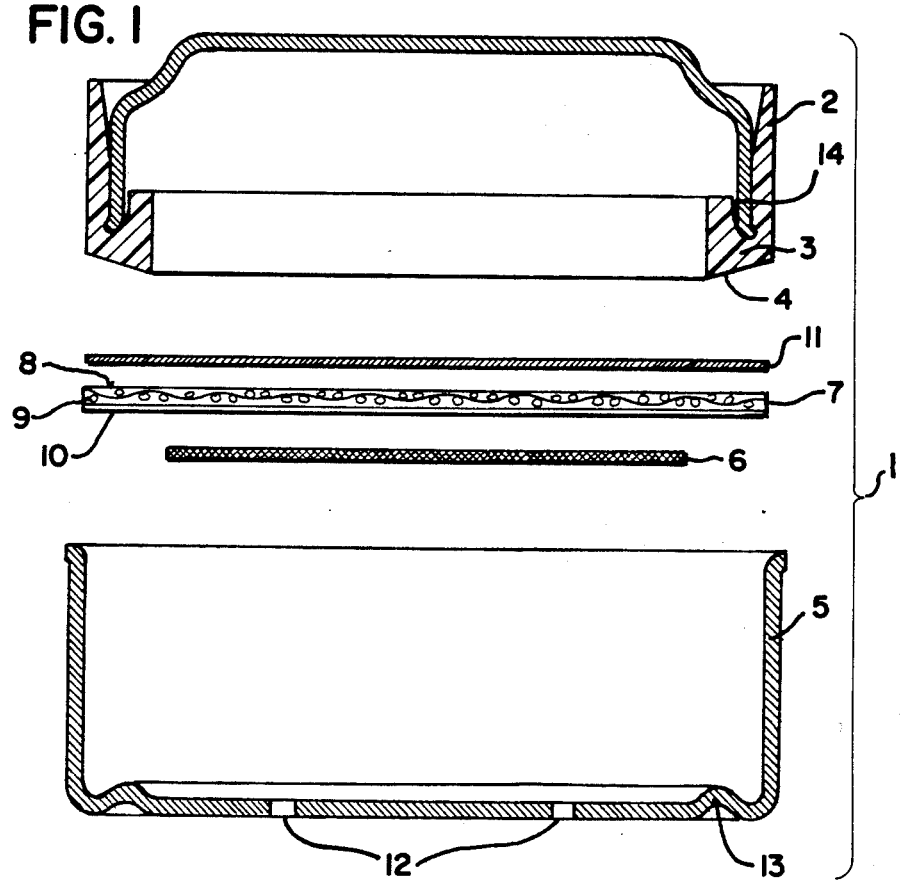
FIG. 1 shows the individual components of the button cell before assembly.

With reference to FIG. 1, an inner cup 1 is shown which primarily serves to receive the negative electrode material (see FIG. 2), e.g. zinc powder made into a paste with lye. A sealing ring 2 of synthetic plastic or the like is slipped over the rim of the inner cup 1, or if desired, is molded onto the rim, enclosing the rim of the metal cup 1 within a U-shaped cavity formed in the sealing base 3 of the sealing ring 2. In accordance with the present invention, portions of the bottom 4 of the sealing base 3 slope upwardly in radial direction from the inside of the sealing base 3 toward its outside. The angle of inclination from the horizontal lies between 10 and 25 degrees, and preferably is about 15 degrees.

An outer metal cup 5 is provided to receive various components including an air distribution layer 6, a positive electrode 7 comprised of an active carbon layer 8 traversed by a mesh conductor 9 and a hydrophobic PTFE cover layer 10, and a separator 11. Supply of air/oxygen to the resulting cathode is made possible by means of apertures 12 provided in the bottom of the outer metal cup 5.

Further in accordance with the present invention, the outer metal cup 5 is provided with an inwardly protruding rib 13 formed from its bottom. The protruding rib 13 is preferably concentric in configuration, the diameter of which should be smaller than the diameter of the cylindrical walls of the inner metal cup 1, but not smaller than the inner diameter of the sealing base 3.

Figure 2:
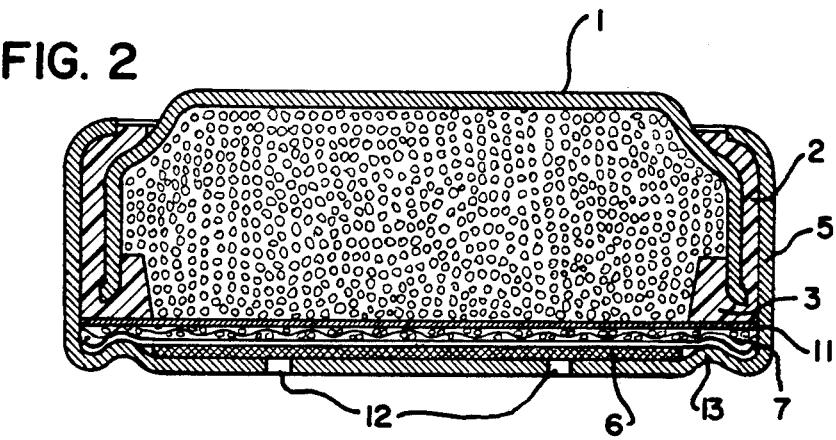
FIG. 2 shows the fully assembled cell.

Upon assembly, and with reference to FIG. 2, the multilayer positive electrode 7 is positioned directly upon the rib 13, retaining the air distribution layer 6 between the positive electrode 7 and the bottom of the outer metal cup 5. The separator 11 is placed over the positive electrode 7, as shown. Insertion of the inner metal cup 1 into the outer metal cup 5 presses the electrode 7 against the bottom of the outer metal cup 5 by means of the bottom wall 4 of the sealing base 3 in a manner which reliably prevents inward bowing of the electrode 7 during assembly of the cell.

Thus, upon closure of the cell by means of an appropriate crimping tool, the electrode 7 is pressed between the rib 13 and the sealing base 3, retaining the electrode 7 in desired position between the sealing ring 2 and the cathode cup 5. Morever, the inwardly disposed leg defining the U-shaped cavity of the sealing base 3 is firmly pressed against the inner wall of the inner metal cup 1 so that the air gap 14 (FIG. 1) developed at this interface disappears, extending the electrolyte creepage path. Pressing the sealing base 3 against the separator 11 and the electrode 7 is comparable in function to a domed spring which reliably maintains its compressive forces over extended periods of time, even when, for example, the plastic of the hydrophobic cover layer 10 or the depolarizing layer 9 relax. Likewise, electrical contact between the mesh conductor 8 and the metal cup 5 is reliably maintained.

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. In an air/oxygen cell comprising an inner metal cup for receiving electrolyte and negative electorde material and an outer metal cup for receiving a multi-layer positive electrode, said cups being joined with interposition of an insulating seal, the improvement comprising:
    an inwardly extending rib shaped in the bottom of the outer metal cup, wherein said rib is spaced from the periphery of the bottom of the outer metal cup, and wherein said rib is positioned so that said multi-layer positive electrode is firmly clamped between the rib and the seal.

2. The air/oxygen cell of claim 1 wherein the multi-layer positive electrode is clamped between the rib and bottom portions of the seal, and wherein said bottom portions of the seal are sloped prior to said clamping.

3. The air/oxygen cell of claim 2 wherein the bottom portions of the seal slope upwardly in radial direction from inner portions of the seal toward outer portions of the seal.

4. The air/oxygen cell of claim 3 wherein the angle of inclination of the sloping portions with respect to the horizontal lies between 10 and 25 degrees.

5. The air/oxygen cell of claim 4 wherein the angle of inclination is about 15 degrees.

6. The air/oxygen cell of claim 1 wherein the rib and the seal combine to engage said electrode so that bowing of the electrode is prevented.

7. The air/oxygen cell of claim 1 wherein the rib is concentric with the bottom of the outer metal cup.

8. The air/oxygen cell of claim 7 wherein the diameter of the rib is less than the diameter of the inner metal cup but no less than the inner diameter of the seal.

9. The air/oxygen cell of claim 1 wherein the air/oxygen cell is button shaped.

10. The air/oxygen cell of claim 1 wherein the rib forms an annular ring extending from the bottom of the outer metal cup, the outer diameter of which is less than the inner diameter of the outer metal cup.

11. The air/oxygen cell of claim 10 wherein portions of the bottom of the outer metal cup located on either side of the annular ring are substantially co-planar.

12. The air/oxygen cell of claim 1 wherein the rib forms an annular bead bordered on each side by portions of the bottom of the outer metal cup.

13. The air/oxygen cell of claim 12 wherein the rib slopes downwardly toward the bottom of the outer metal cup on each side of the bead.

14. The air/oxygen cell of claim 13 wherein portions of the bottom of the outer metal cup located on either side of the bead are substantially co-planar.

* * * * *